Nov. 20, 1962 K. J. HUMPHRIES 3,064,547
TRI-AXIAL CAMERA MOUNT

Filed Jan. 22, 1960 4 Sheets-Sheet 1

INVENTOR.
Keith J. Humphries
BY S.J. Rotondi,
A. J. Dupont & E.C. Gott

Nov. 20, 1962  K. J. HUMPHRIES  3,064,547
TRI-AXIAL CAMERA MOUNT
Filed Jan. 22, 1960  4 Sheets-Sheet 2
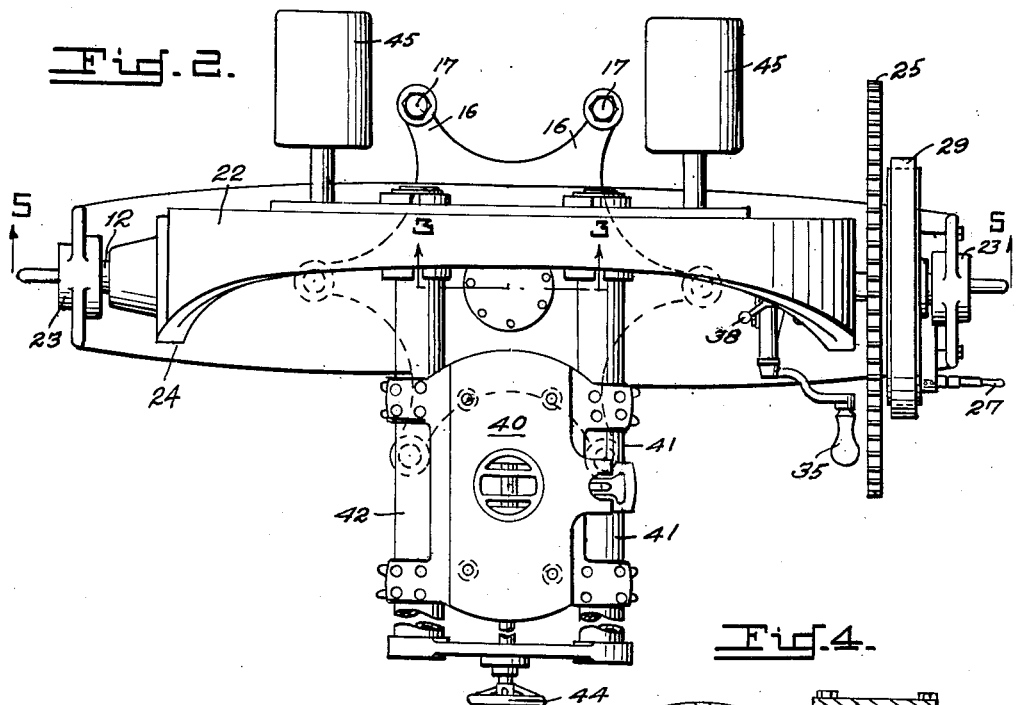
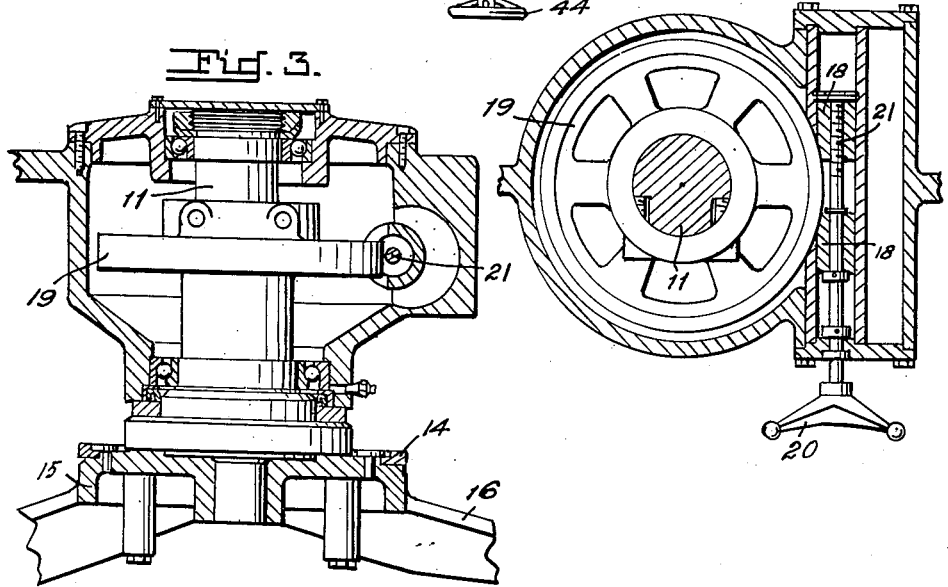
INVENTOR.
Keith J. Humphries
BY
S. J. Rotondi, A. J. Dupont & E. C. Gott

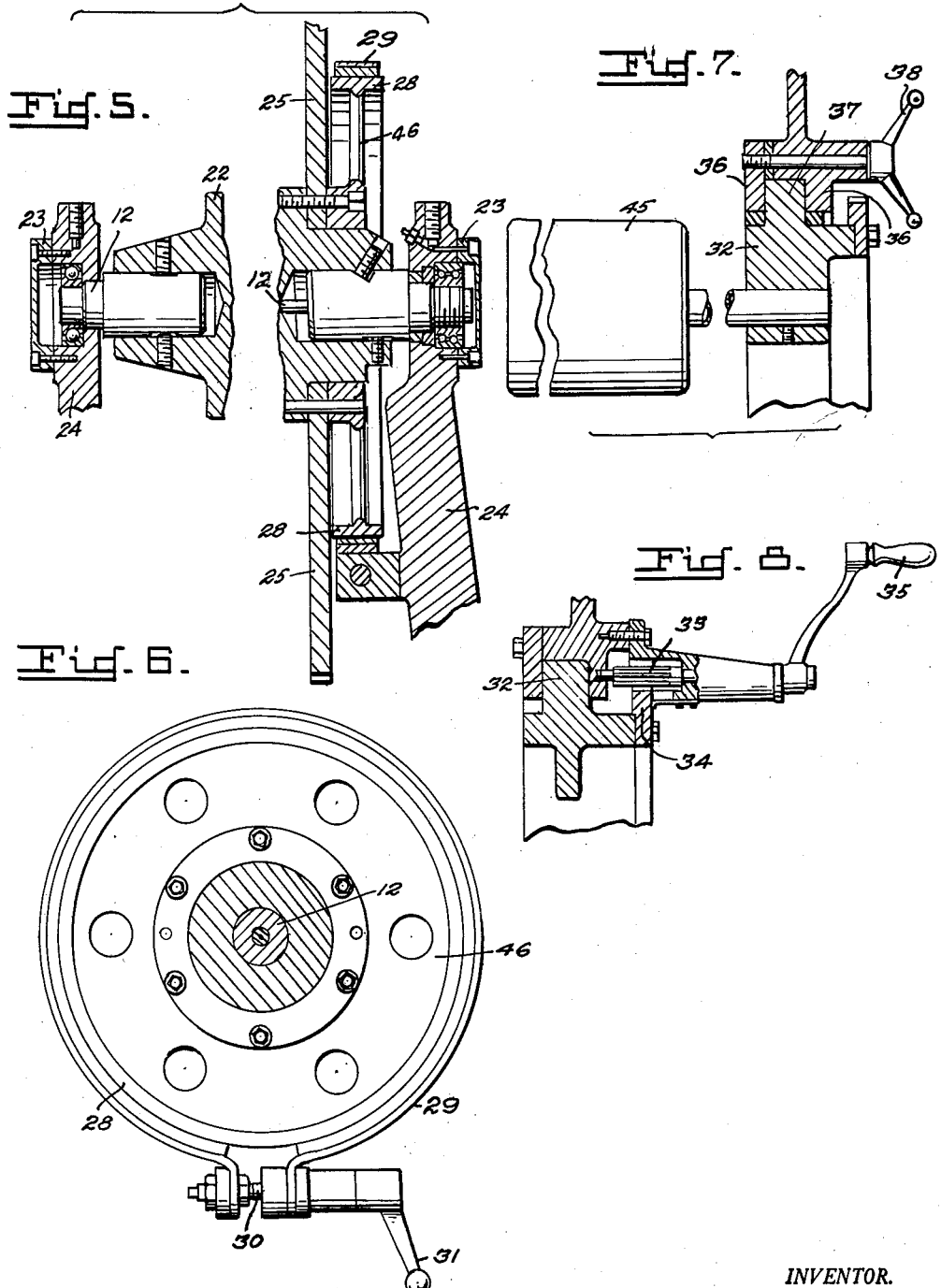

Nov. 20, 1962  K. J. HUMPHRIES  3,064,547
TRI-AXIAL CAMERA MOUNT
Filed Jan. 22, 1960  4 Sheets-Sheet 4
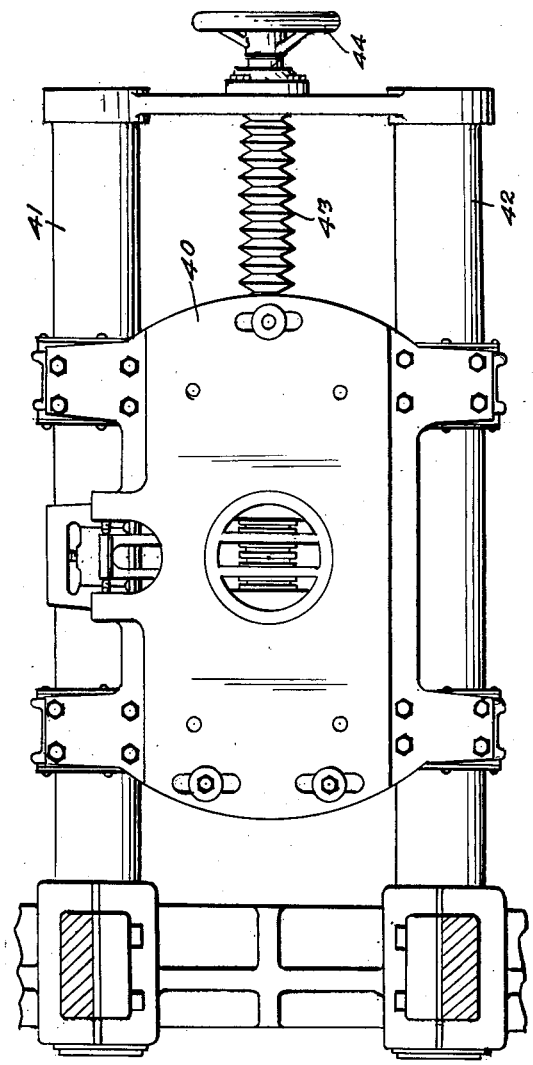
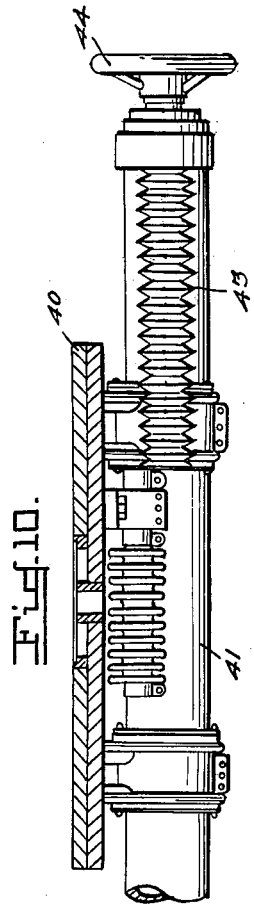
INVENTOR.
Kieth J. Humphries
BY S. J. Rotondi,
A. J. Dupont & E. C. Gott

United States Patent Office 3,064,547
Patented Nov. 20, 1962

3,064,547
TRI-AXIAL CAMERA MOUNT
Keith J. Humphries, 230 W. Hadley Ave.,
Las Cruces, N. Mex.
Filed Jan. 22, 1960, Ser. No. 4,583
1 Claim. (Cl. 95—86)
(Granted under Title 35, U.S. Code (1952), sec. 266)

The invention described herein may be manufactured and used by or for the Government for Governmental purposes without payment to me of any royalty thereon.

This invention relates to triaxial mountings for a camera, which permits the camera an unobstructed view in all directions. This feature is particularly desirable, where the camera is used for tracking missiles.

It is an object of this invention to provide a camera mount which is so constructed that pictures may be taken in any direction, elevation, or tilt position, utilizing the feature of only one surveyed nodal point. The nodal point is the point in a lens through which all light rays must pass before entering the film plane.

It is a further object of this invention to provide a camera mount on which the camera may be rotated about any or all of three axes which are perpendicular to each other at a common intersection.

It is a still further object of this triaxial camera mount to be so designed that the nodal point of the camera may be adjusted to coincide with the point of intersection of the three axes and remain in that fixed relation while the camera is operated in any angle of elevation, azimuth or tilt desired.

These and other objects are attained by designing the gimbal or roll axis ring, which supports the camera, in such a manner that the camera is capable of tilt or rotational movement as well as elevation and spin rotation.

In accordance with these and other objects which will become apparent hereinafter, the present invention will now be described with reference to the accompanying drawings illustrating a preferred embodiment thereof.

Referring to the drawings:

FIG. 2 is a top view of the apparatus looking downward on FIG. 1;

FIG. 3 is a partial sectional view of the base of the mount assembly taken in direction shown on the 3—3 line of FIG. 2;

FIG. 4 is a horizontal sectional view of the azimuth trunnion taken on the 4—4 line of FIG. 1;

FIG. 5 is a horizontal sectional view taken on the elevation axis 5—5 line of FIG. 2;

FIG. 6 is a view of the brake assembly for the elevation gear taken on the line 6—6 of FIG. 1;

FIG. 7 is a horizontal section of the brake mechanism for the ring supporting the camera taken on the 7—7 line of FIG. 1;

FIG. 8 is a horizontal section view of the gear for revolving the roll axis ring taken on the line 8—8 of FIG. 1;

FIG. 9 is a horizontal section of the adapter plate supporting the camera on the 9—9 line of FIG. 1; and FIG. 10 is a vertical section of the worm gear for moving the adapter plate taken on the 10—10 line of FIG. 1.

Figure 1:
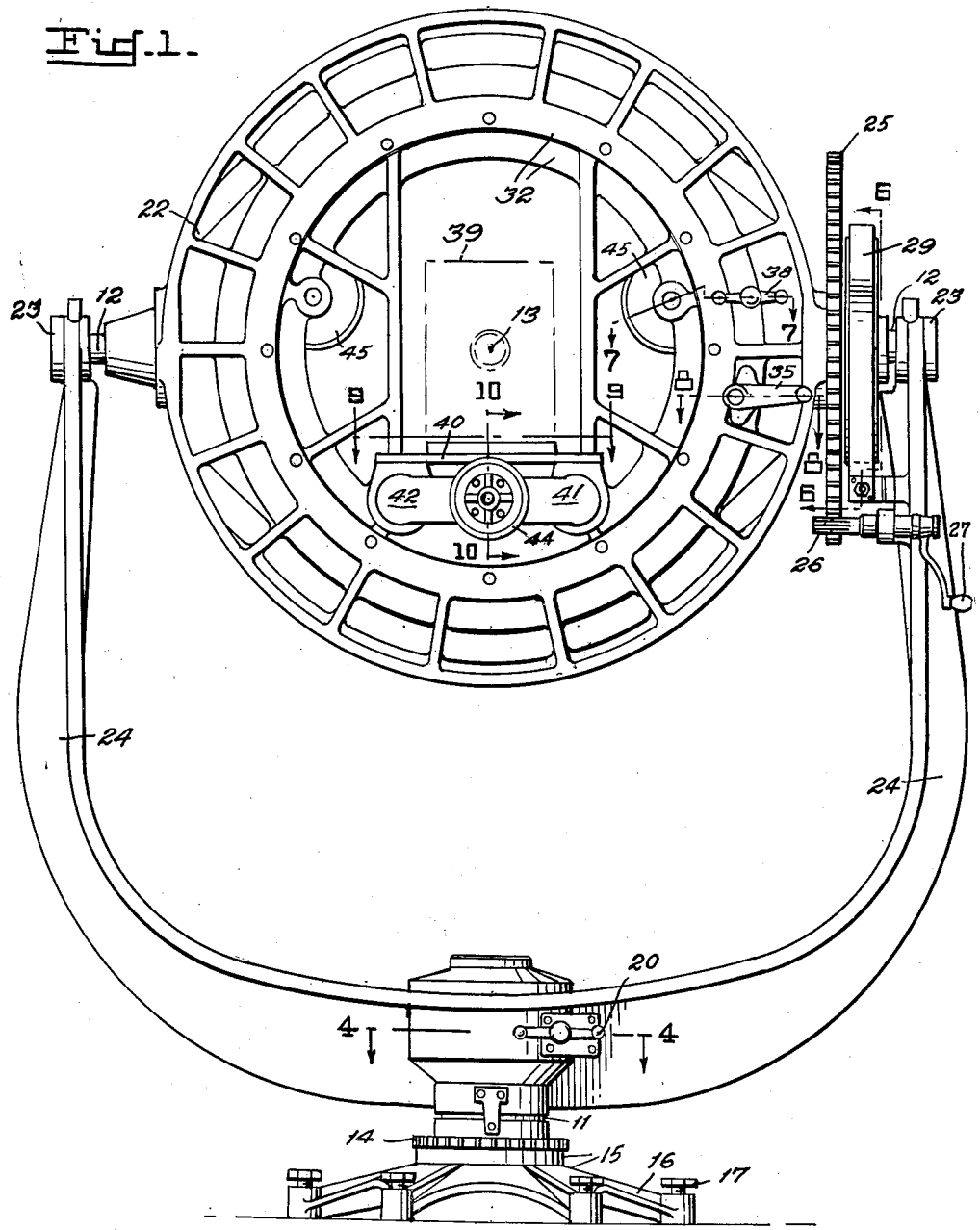
FIG. 1 is a front elevational view of a triaxial mount assembly for a camera.

The assembly shown in FIG. 1, shows the three axes of the triaxial mount. The primary or azimuth axis 11 is the vertical center line through the mount. The secondary or elevation axis 12 is perpendicular to the primary axis 11 and is the horizontal center line through the mount. The tertiary or roll axis 13, is perpendicular to the above two axes 10 and 11 at their intersection and is also perpendicular to the plane of the drawing. These three axes allow a camera placed on the mount to be directed toward any line on a sphere.

The primary axis rotation is accomplished through the use of the azimuth trunnion 14 which rotates about the azimuth base 15 and which is supported by arms 16. Each arm 16 has set screws 17 which are adjustable to level the base member 15. The trunnion 14 is finely machined and the entire assembly is readily rotated on the axis 11 manually to obtain the proper azimuth setting. This setting is locked in the desired position by the brake shoes 18 shown in detail in FIG. 4, in which 19 is the azimuth brake wheel on shaft 11, which is tightened by the handle 20 through the worm gear 21. Only slight torque on the handle 20 is required to completely lock the brake wheel 19 in the azimuth setting.

The elevation yoke 22 rotates about the secondary axis 12 in bearing seats 23 located in the extremities 24 of the azimuth trunnion 14, the axis 12 being perpendicular to the primary axis 11. The elevation yoke 22 is equipped with an elevation gear 25, actuated by a pinion 26, rotated by the handle 27. The elevation yoke is equipped with a brake wheel 46 as shown in FIG. 6 in which 28 is the brake drum, 29 the brake band actuated by the worm gear 30, manually operated by the handle 31 to lock the elevation yoke in any desired position.

The tertiary axis 13 is perpendicular to the primary and secondary axes at their intersection, and is the center of the roll axis ring or gimbal ring 32 which rotates within the elevation yoke 22 and is supported thereby. By using Meechanite, a form of cast iron, for both the elevation yoke and the roll ring, the necessity of using ball bearings is eliminated. This material has the inherent quality which allows adequate slippage between yoke 22 and gimbal ring 32 when the proper lubricant is used. The ring 32 rotates in the yoke 22 on the principle of a journal bearing, and the rotation of ring 32 gearing is accomplished through the use of a spur ring gear 34, FIG. 8, and a pinion manually operated by handle 35. The braking mechanism for the ring 32 is shown in detail in FIG. 7, in which a clamp 36 exerts a force on a wheel segment 37 on the inside of the gimbal ring 32 and is locked in position by the handle 38.

The camera 39 is fastened to an adapter plate 40 which is secured to guides 41 and 42 and movable thereon to adjust the position of the camera longitudinally. The guides 41 and 42 are attached to the roll ring 32, and permit the movement of the camera in a direction parallel to the tertiary axis. This movement of the camera is accomplished as shown in FIG. 9 by means of the worm lead screw 43 actuated by the handle 44. This action is necessary to allow for the proper positioning of cameras of different focal lengths. The camera 39 may also be elevated slightly from the adapter plate 40 by any suitable means (not shown) to bring the axis of the camera lens in line and concident with the tertiary axis.

As shown in FIGURE 2, the counterweights 45 are attached to the gimbal ring 32, to balance the weight of the camera and the adapter plate mechanism to permit free rotation of the gimbal ring 32 within the elevation yoke 22.

In operation, the camera 39 is adjusted or elevated on the adapter plate 40 until the axis of the camera lens coincides with the axis of the gimbal ring 32. By rotating the handle 44, the adapter plate may be moved by the worm screw 43 in a direction parallel to the tertiary axis or the axis of the gimbal ring 32, until the nodal point of the camera lens coincides with the point of intersection of the primary and secondary axes, which by design, is the center of the gimbal ring. Once the nodal point is adjusted to coincide with the intersection of the three axes, no further survey is necessary while the camera mount remains physically at the same location. Reference targets between the camera and the desired trajectory path may be taken at ground levels, eliminating observation poles and targets which may be moved by the elements. Thus the camera may be used thereafter without any delays for additional surveys, in any angle of elevation, azimuth, or tilt desired. The delicacy of the adjustment of the mount on its several axes is dependent entirely on the quality and accuracy built into the bearings of the individual axes.

Heretofore, mounts for cameras using the three axis principle required a resurvey each time a missile was fired. Since the object spaced nodal point is that point in a lens from which all surveys are made, this triaxial mount requires only one survey to adjust the nodal point at the intersection of the three axes. By having the nodal point fixed at all orientations of the mount, it is unnecessary to resurvey the camera for each missile shoot. The camera, therefore, may be rotated about any of the three axes without changing the position of this point, due to the fact that the nodal point of any particular camera is adjusted at the intersection of all three axes.

What is claimed is:

A tri-axial mount for a fixed and/or missile tracking camera comprising a gimbal ring having a camera mounting therein and affixed thereto, said gimbal ring being free to rotate about a longitudinal axis, a camera lens supported on the camera mounting in line with said longitudinal axis and adjustable thereon along said longitudinal axis, a concentric ring supporting said gimbal ring around its periphery and adapted to permit the rotation of the gimbal ring therein, a yoke pivotally supporting said concentric ring at its periphery to permit said concentric ring and the contained camera mounting to rotate about a horizontal axis that is perpendicular to said longitudinal axis, a swivel base plate supporting said yoke, a base member supporting said swivel base plate, said swivel base plate being free to rotate on said base member about a vertical axis, said vertical axis being perpendicular to each of the other axes at their intersection to permit free rotation of the camera a full 360° on any or all axes, and means for adjusting the camera lens so that the nodal point of the lens coincides with the intersection of the three axes and is maintained in that fixed position.

References Cited in the file of this patent

UNITED STATES PATENTS

| 2,364,363 | Howell | Dec. 5, 1944 |

FOREIGN PATENTS

| 831,940 | France | June 20, 1938 |
| 1,014,819 | France | June 18, 1952 |